United States Patent [19]
Yamada et al.

[11] Patent Number: 5,629,106
[45] Date of Patent: May 13, 1997

[54] CONNECTION STRUCTURE AND CONNECTION FITTING FOR AN ELECTRODE POST OF A BATTERY

[75] Inventors: Satoshi Yamada; Hidehiko Kuboshima, both of Haibara-gun, Japan

[73] Assignee: Yazaki Corporation, Tokyo, Japan

[21] Appl. No.: 672,966

[22] Filed: Jul. 1, 1996

[30] Foreign Application Priority Data

Jul. 3, 1995 [JP] Japan ................... 7-167588

[51] Int. Cl.[6] ........................................ H01M 2/20
[52] U.S. Cl. .................. 429/121; 429/123; 439/846
[58] Field of Search ........................... 429/121, 123; 439/500, 522, 575, 726, 754, 759, 835, 846, 859, 860, 883

[56] References Cited

U.S. PATENT DOCUMENTS

| | | | |
|---|---|---|---|
| 3,663,927 | 5/1972 | Brunner | 439/522 |
| 3,721,945 | 3/1973 | Hults | 439/846 |
| 3,980,387 | 9/1976 | Neidecker | 439/846 X |
| 4,778,408 | 10/1988 | Morrison | 439/522 |

FOREIGN PATENT DOCUMENTS

| | | | |
|---|---|---|---|
| 6-140020 | 5/1994 | Japan | H01M 2/20 |
| 7-130353 | 5/1995 | Japan | H01M 2/34 |

*Primary Examiner*—Anthony Skapars
*Attorney, Agent, or Firm*—Sughrue, Mion, Zinn, Macpeak & Seas

[57] ABSTRACT

An electrode post connection structure for connecting a connection conductor to an electrode post of a battery through a connection fitting, which includes a lock stage portion formed on a circumference of the electrode post, a tapered portion formed at a top portion of the electrode post, a lock spring inserted in the connection fitting so as to engage with the lock stage portion to thereby lock the electrode post and the connection fitting with each other, and a hollow elastic body accommodated in the connection fitting so as to press the connection conductor to thereby connect the electrode post and the connection conductor to each other. Thus, work for connecting a connection conductor to an electrode post of a battery is simplified, and the electric characteristic and reliability of the connection are improved greatly.

9 Claims, 7 Drawing Sheets

CONNECTION STRUCTURE AND CONNECTION FITTING FOR AN ELECTRODE POST OF A BATTERY

BACKGROUND OF THE INVENTION

1. Field of the Invention

The present invention relates to an electrode post connection structure and a fitting thereof when an electric conductor is connected to an electrode post of a battery.

2. Background

Conventionally, when two batteries or more are to be connected to each other, a plate-like connection terminal c is interposed between electrode posts b and b' of two batteries a and a' and fastened to the electrode posts b and b' by a device of nuts d and d' respectively, for example, as shown in FIG. 12 as disclosed in Unexamined Japanese Patent Publication No. Hei. 6-140020.

In this conventional connection structure, however, there is a problem that since it is necessary to perform such troublesome work to fit and fasten the nuts d and d' onto the electrode posts b and b' respectively in connecting operation, considerably much labor and long time are required in the case of connecting a large number of batteries to each other so that the productivity is remarkably reduced.

SUMMARY OF THE INVENTION

In view of the foregoing problem, it is an object of the present invention to provide an electrode post connection structure and a connection fitting thereof, in which a work for connecting a connection conductor to an electrode post of a battery is simplified, and an electric characteristic and reliability of the connection are improved greatly.

In order to achieve the above object, according to a first aspect of the present invention, an electrode post connection structure for connecting a connection conductor to an electrode post of a battery through a connection fitting, includes a lock stage portion formed on a circumference of the electrode post, a tapered portion formed at a top portion of the electrode post, a lock spring inserted in the connection fitting so as to engage with the lock stage portion to thereby lock the electrode post and the connection fitting with each other, and a hollow elastic body accommodated in the connection fitting so as to press the connection conductor to thereby connect the electrode post and the connection conductor to each other.

In the above electrode post connection structure, preferably, the hollow elastic body is a coil spring.

According to a second aspect of the present invention, an electrode post connection fitting includes a fitting cylinder having an electrode insertion hole formed in its bottom wall, lock windows formed in its head portion, and a conductor insertion opening formed in its circumferential; a flexible hollow elastic body accommodated in the fitting cylinder; and a lock spring having openable/closable grasping arms; an unlock button having spring holding portions provided with guide slopes respectively, the lock spring being inserted into the lock windows so as to be mounted on the spring holding portions of the unlock button to thereby movably support the unlock button.

In the above electrode post connection fitting, preferably, the hollow elastic body is a coil spring.

In the above electrode post connection fitting, preferably, an outside of the fitting cylinder is covered with an insulation cover having an operation hole.

According to the present invention, the lock spring is made to engage with the lock stage portion of the electrode post by only one step of operation to fit the cylinder of the connection fitting onto the electrode post. Further, unlock of the cylinder from the electrode post can be performed also by only one step of operation to push the unlock button. Consequently, the connection and separation work is simplified so that the workability can be remarkably improved in the case of connecting a large number of batteries to each other.

Moreover, the connection conductor is normally urged against the electrode post by the device of the hollow elastic body such as a coil spring, or the like, accommodated in the cylinder and, therefore, the electric connection can be surely performed to thereby is obtain high reliability.

DETAILED DESCRIPTION OF PREFERRED EMBODIMENTS

Figure 1:
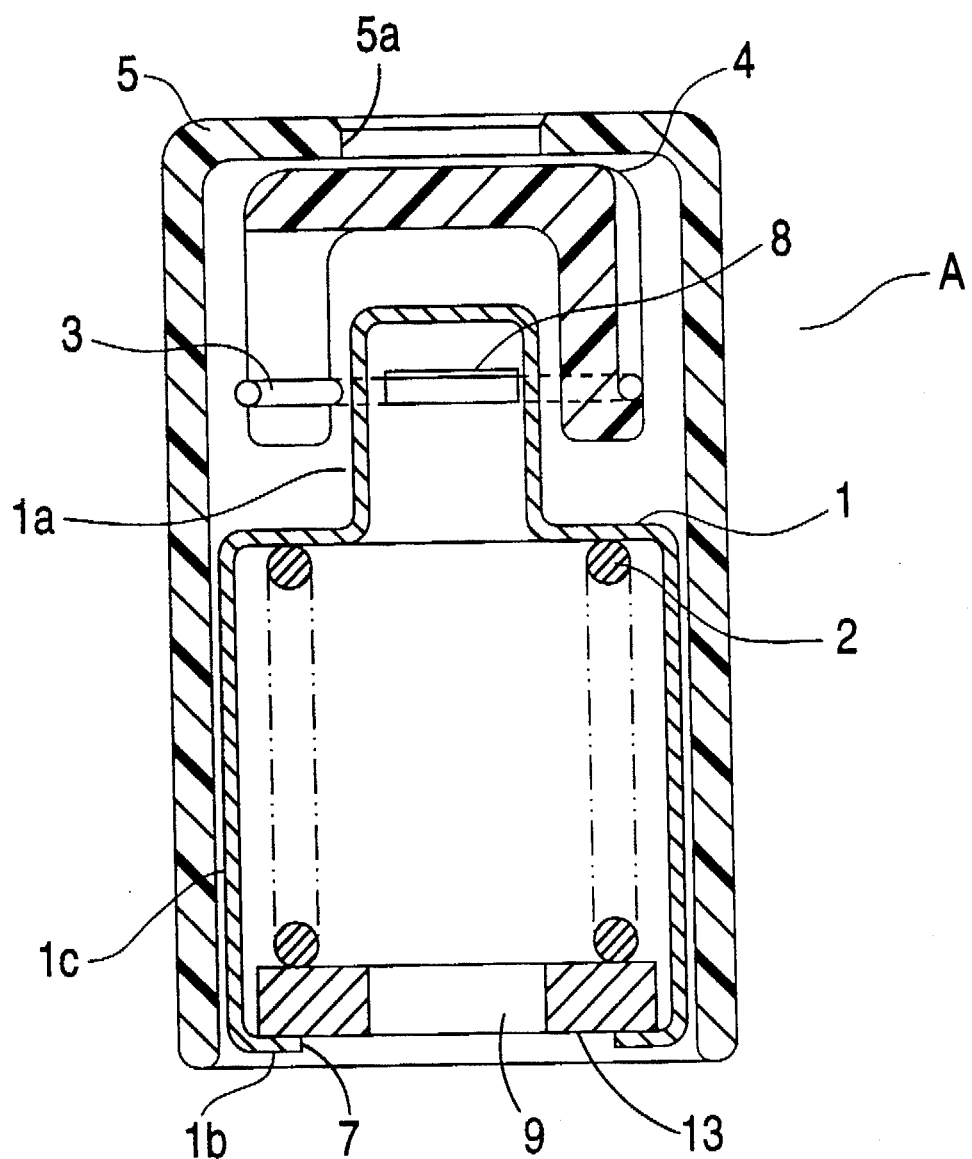
FIG. 1 is a vertical sectional view showing a connection fitting for an electrode post according to a first embodiment of the present invention.
Figure 2:
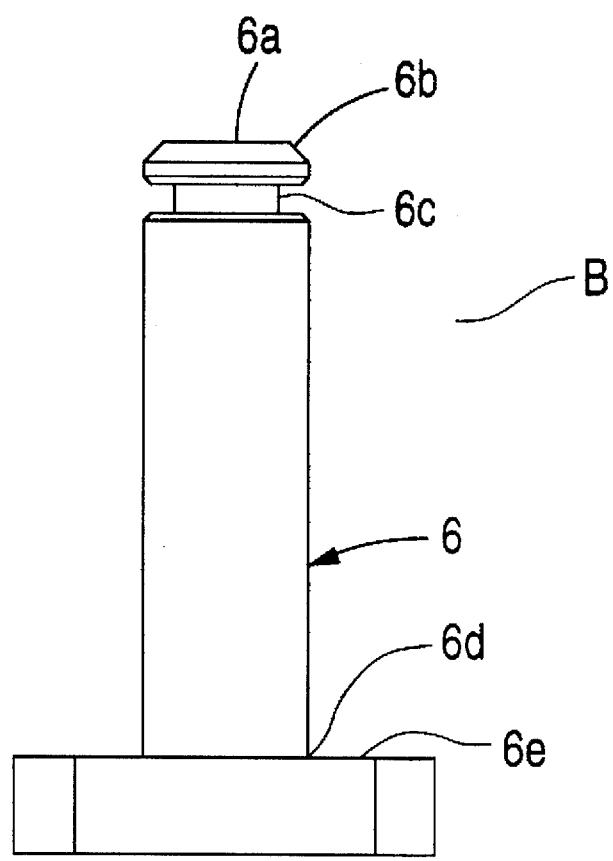
FIG. 2 is a front view showing an electrode post in the first embodiment of the present invention.

FIG. 1 is a vertical sectional view showing an electrode post connection fitting A according to a first embodiment of the present invention, and FIG. 2 is a front view showing an electrode post B.

The electrode post connection fitting A includes a fitting cylinder 1 made of a thin conductive metal plate, a coil spring 2 which is a hollow elastic body accommodated in the fitting cylinder 1, a lock spring 3 formed from elastic metal wire through bending work, an unlock button 4 of synthetic resin, and an insulation cover 5 applied to the outside of the fitting cylinder 1.

The electrode post B includes a cylindrical electrode base 6 mounted on a battery. The cylindrical electrode base 6 has a top portion 6a, a tapered portion 6b formed on a circumference of the top portion 6a of the electrode base 6, a lock stage portion 6c formed in the vicinity of and under the tapered portion 6b, and a connection portion 6e formed at a base portion 6d so as to come into contact with a connection conductor such as a bus bar or the like.

Figure 3:
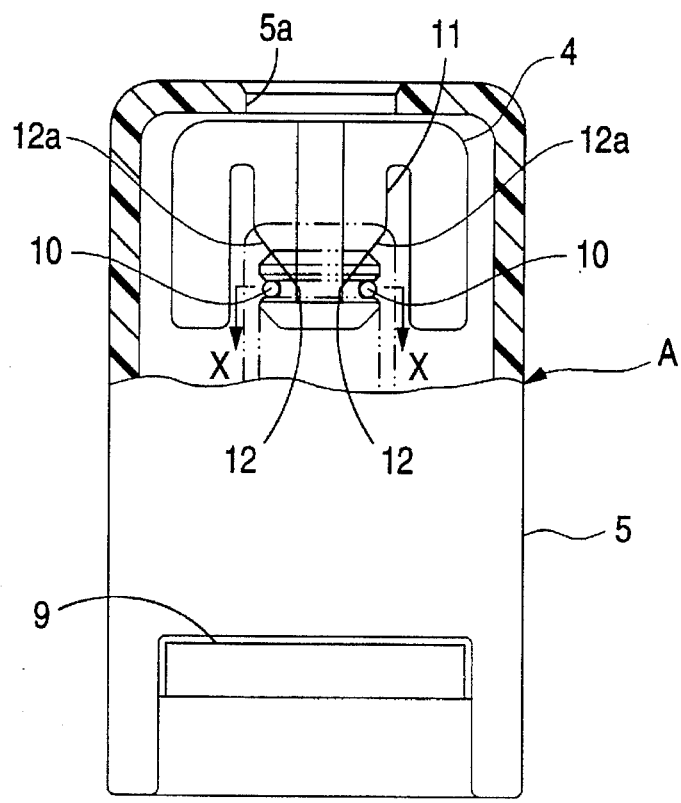
FIG. 3 is a broken side view of an insulation cover of FIG. 1 showing a locked state between a lock spring and an unlock button.

In the fitting cylinder 1 of the electrode post connection fitting A, a head portion 1a is reduced in diameter and an electrode fitting opening 7 which is to be fitted onto the electrode post B is formed in a bottom wall 1b. The head portion 1a is provided for accommodating the top portion 6a of the electrode post B, and has, at its opposite sides, a pair of lock windows 8 through which the lock spring 3 is inserted. A conductor insertion opening 9 is formed in a portion of a peripheral wall 1c at a position in the vicinity of the bottom wall 1b so as to communicate with the electrode fitting opening 7 as shown also in FIG. 3.

Figure 4:
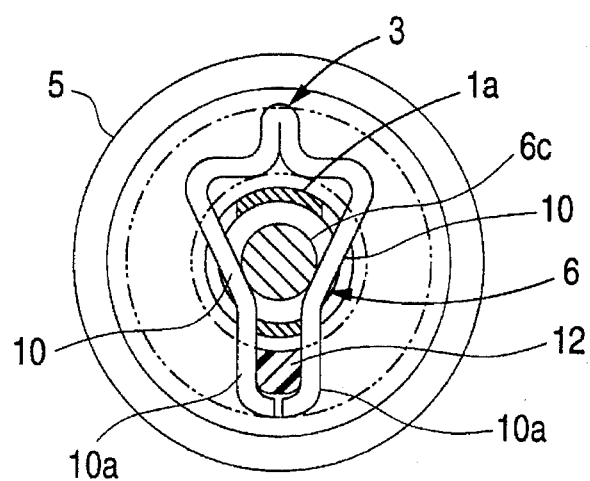
FIG. 4 is a sectional view taken on line X—X of FIG. 3.

The lock spring 3 is made from metal wire which is bent at its center portion to form a pair of openable/closable grasping arms 10 and 10 which extend to the opposite end portions as shown in FIG. 4.

The unlock button 4 has a supporting wall 11 for covering the head portion 1a of the fitting cylinder 1, and spring holding portions 12 and 12 formed in the lower end portion of the supporting wall 11 so as to have guide slopes 12a and 12a which are formed by cutting opposite edges of the supporting wall 11.

The unlock button 4 is supported in such a manner that the respective grasping arms 10 and 10 of the lock spring 3 are inserted through the lock windows 8 and 8 located at the opposite sides of the fitting cylinder 1 and the respective spring holding portions 12 and 12 of the unlock button 4 are grasped between end portions 10a and 10a of the grasping arms 10 and 10.

The insulation cover 5 is formed through molding with a synthetic resin material so as to have a cylindrical shape. An operation hole 5a is opened in a top portion of the insulation cover 5 so that the unlock button 4 can be pushed through the operation hole 5a.

Next, description will be made as to the operations of the above parts when the foregoing electrode post connection fitting A is to be fitted onto the electrode post B of the battery.

First, the connection conductor 13 is inserted into the conductor insertion opening 9 of the electrode post connection fitting A so that the connection conductor 13 is slightly pressed by the coil spring 2 so as to be held between the bottom wall 1b of the fitting cylinder 1 and the coil spring 2.

Figure 5:
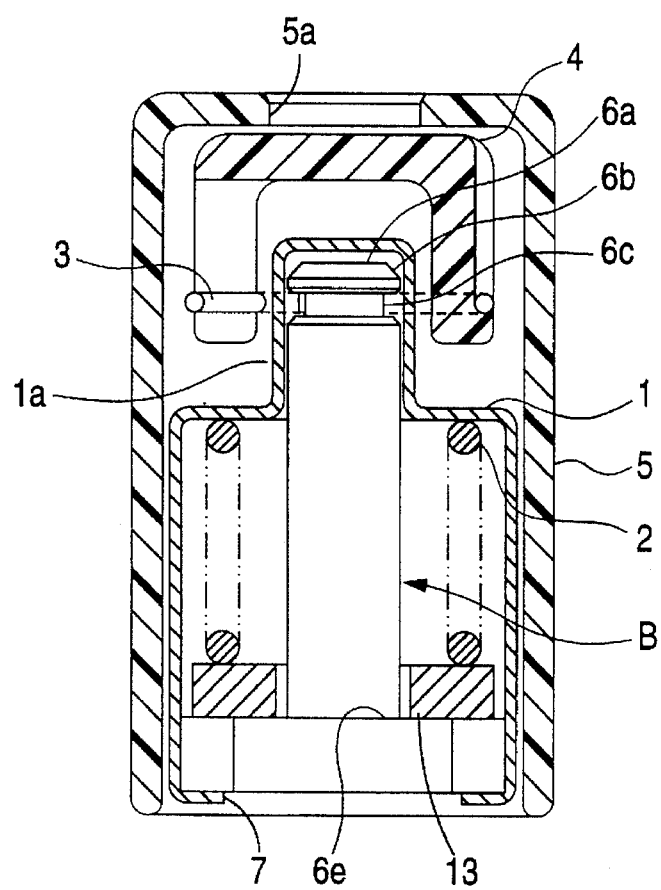
FIG. 5 is a vertical sectional view showing a state where a connection electric conductor and the electrode post are connected to each other through the electrode post connection fitting of FIG. 1.

When the electrode fitting opening 7 of the electrode post connection fitting A is fitted and pressed onto the top portion 6a of the electrode base 6 of the electrode post B, the top portion 6a of the electrode base 6 is inserted into the head portion 1a of the fitting cylinder 1 while compressing the coil spring 2. When the insertion onto the electrode post B is advanced, the lock spring 3 abuts on the tapered portion 6b of the electrode base 6 so that the grasping arms 10 and 10 of the lock spring 3 are mutually opened along the tapered portion 6b and led into the lock stage portion 6c of the electrode base 6. As a result, the fitting cylinder 1 is locked to the electrode base 6 as shown in FIG. 5.

At this time, the connection portion 6e of the electrode base 6 and the connection conductor 13 are electrically surely connected to each other because both of them are urged against each other by the coil spring 2.

Figure 6:
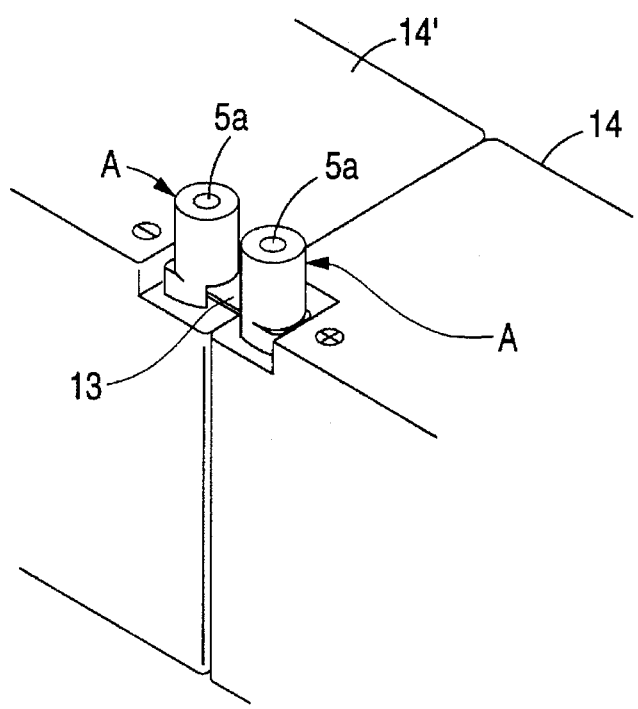
FIG. 6 is a perspective view showing a state where electrode posts of batteries are connected to each other through the electrode post connection fittings of FIG. 1.

FIG. 6 is a perspective view showing the exterior of batteries 14 and 14' which are connected to each other through the electrode post connection fitting A.

Figure 7:
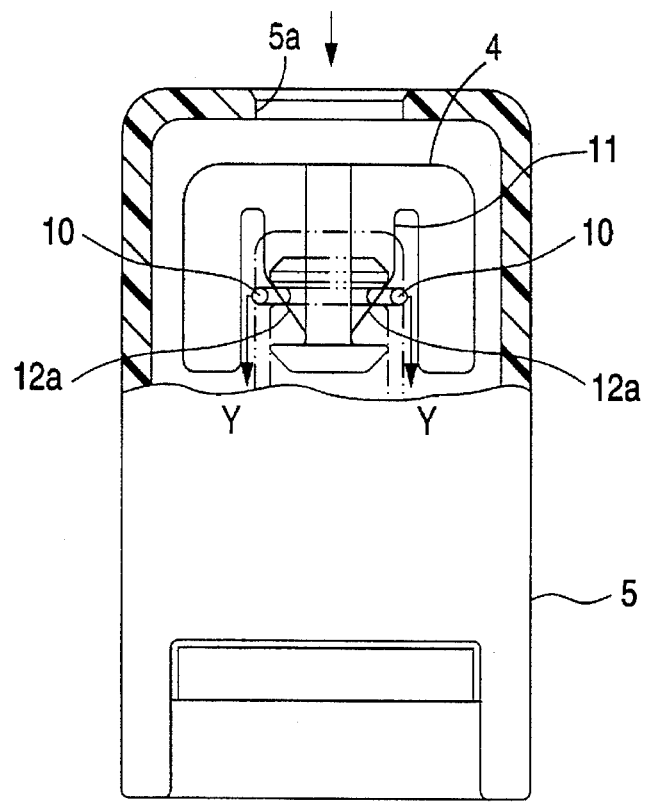
FIG. 7 is a broken side view of the insulation cover of FIG. 5 for explaining a step of releasing locking of the lock spring.

When the electrode post connection fitting A is to be separated from the electrode post B, the unlock button 4 is pushed through the operation hole 5a of the insulation cover 5 as shown by an arrow in FIG. 7.

Figure 8:
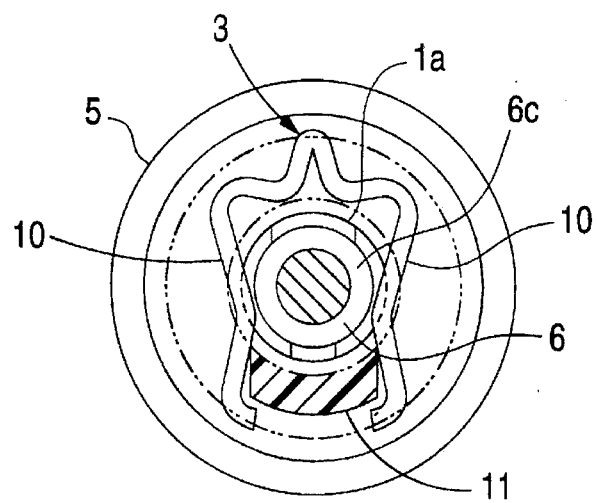
FIG. 8 is a sectional view taken on line Y—Y of FIG. 7.

When the unlock button 4 is pushed, the supporting wall 11 of the unlock button 4 descends and the grasping arms 10 and 10 of the lock spring 3 located at the spring holding portions 12 and 12 move along the guide slopes 12a and 12a so that the interval between the grasping arms 10 and 10 is increased as shown in FIG. 8. As a result, the grasping arms 10 and 10 are separated from the lock stage portion 6c of the electrode base 6 and the lock between the electrode base 6 and the fitting cylinder 1 is released so that the electrode post connection fitting A is separated from the electrode post B.

Figure 9:
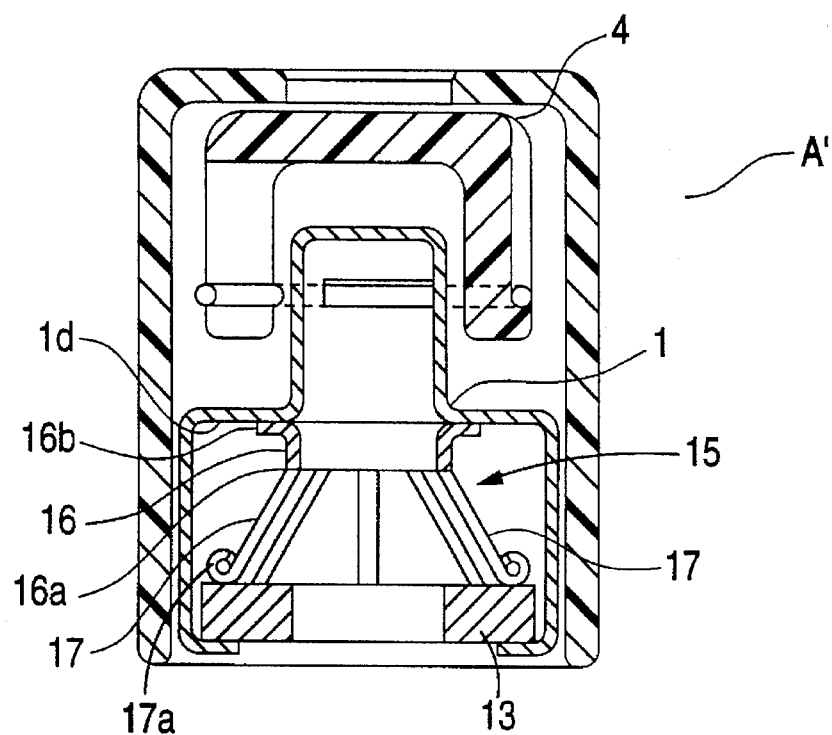
FIG. 9 is a vertical sectional view showing an electrode post connection fitting according to a second embodiment of the present invention.

FIG. 9 is a sectional view showing an electrode post connection fitting A' according to a second embodiment of the present invention. In this embodiment, as the hollow elastic body of the electrode post connection fitting A', a plate-spring elastic body 15 including a plurality of plate springs is used in place of the foregoing coil spring 2. Other members and structure are the same as those of the foregoing electrode post connection fitting A.

Figure 10:
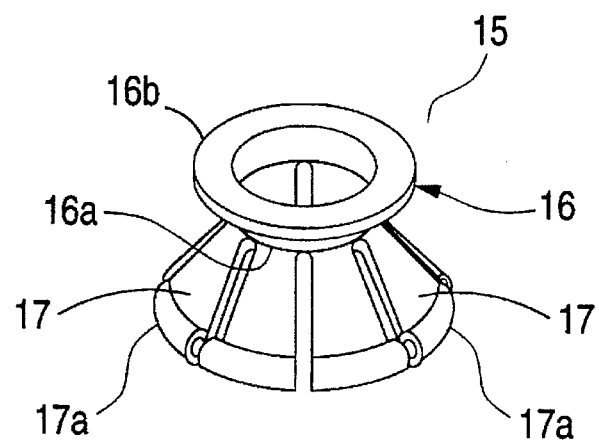
FIG. 10 is a perspective view showing a plate-spring elastic body of FIG. 9.

The plate-spring elastic body 15 includes an annular supporting portion 16 and a plurality of spring portions 17 formed on the periphery of a lower edge 16a of the annular supporting portion 16 as shown in FIG. 10, so that when the plate-spring elastic body 15 is accommodated in a fitting cylinder 1, an upper edge 16b of the supporting portion 16 comes into contact with an upper inner wall 1d of the fitting cylinder 1 and free end portions 17a of the respective spring portions 17 come into contact with an electric connection conductor 13.

Figure 11:
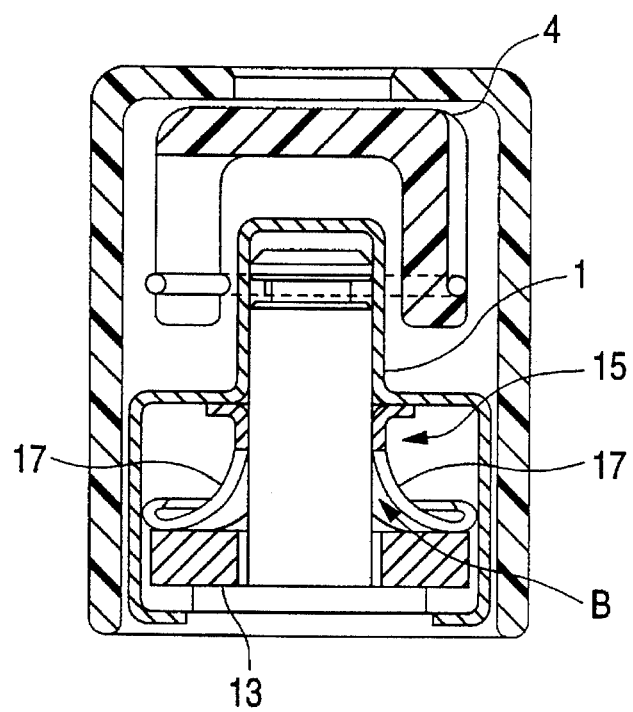
FIG. 11 is a vertical sectional view showing a state where a connection electric conductor and an electrode post are connected to each other through the electrode post connection fitting of FIG. 9.
Figure 12:
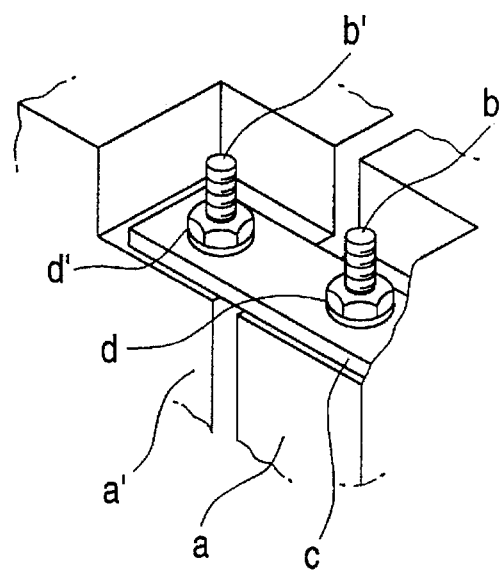
FIG. 12 is a view for explaining the conventional connection structure for a connecting electrode posts of batteries.

When the electrode post connection fitting A' is fitted onto an electrode post B, the spring portions 17 are bent so as to press the connection conductor 13 so that the electrode post B and the connection conductor 13 are electrically surely connected to each other as shown in FIG. 11.

The operation for separating the electrode post connection fitting A' can be performed by pushing an unlock button 4 in the same manner as in the foregoing embodiment.

According to the present invention, the locking and unlocking between the cylinder of the connection fitting and an electrode post of a battery can be performed by only one step of operation. Therefore, the work of connection and separation of the electrode post can be simplified and the workability in the case of connecting a large number of batteries to each other can be remarkably improved. Further, since the connection conductor is made to be in contact with the electrode post in the state where the former is normally urged against the latter by the device of the hollow elastic body such as a coil spring or the like accommodated in the cylinder of the connection fitting, there is such an advantage that sure electrical connection can be realized to obtain high reliability.

What is claimed is:

1. An electrode post connection structure for connecting a connection conductor to an electrode post of a battery through a connection fitting, comprising:

a lock stage portion formed on a circumference of said electrode post;

a tapered portion formed at a top portion of said electrode post;

a lock spring inserted in said connection fitting so as to engage with said lock stage portion to lock said electrode post and said connection fitting with each other; and a hollow elastic body accommodated in said connection fitting so as to press said connection conductor to connect said electrode post and said connection conductor to each other.

2. The electrode post connection structure of claim 1, wherein said hollow elastic body includes a coil spring.

3. The electrode post connection structure of claim 1, wherein said hollow elastic body comprises a plate-spring elastic body including an annular supporting portion and a plurality of spring portions.

4. An electrode post connection fitting, comprising:

a fitting cylinder including an electrode insertion hole formed in a bottom wall thereof, lock windows formed in a head portion thereof, and a conductor insertion opening formed in a circumferential wall thereof;

a hollow elastic body accommodated in said fitting cylinder;

a lock spring having grasping arms; and an unlock button having spring holding portions provided with guide slopes respectively, wherein said lock spring is inserted into said lock windows so as to be mounted on said spring holding portions of said unlock button to movably support said unlock button.

5. The electrode post connection fitting of claim 4, wherein said hollow elastic body is a coil spring.

6. The electrode post connection fitting of claim 4, wherein said hollow elastic body comprises a plate-spring elastic body including an annular supporting portion and a plurality of spring portions.

7. The electrode post connection fitting of claim 4, wherein an outside of said fitting cylinder is covered with an insulation cover having an operation hole.

8. The electrode post connection fitting of claim 7, wherein the operation hole is opened in a top portion of the insulation cover so that said unlock button is pushed through the operation hole.

9. The electrode post connection fitting of claim 4, wherein the head portion of said fitting cylinder is reduced in diameter.

* * * * *